(12) United States Patent
Lenosky et al.

(10) Patent No.: US 7,546,042 B2
(45) Date of Patent: Jun. 9, 2009

(54) SYSTEM AND METHOD FOR REDUCING INTERFERENCE IN AN OPTICAL DATA STREAM USING MULTIPLE, SELECTABLE EQUALIZERS

(75) Inventors: Thomas J. Lenosky, Mountain View, CA (US); Jan Lipson, Cupertino, CA (US); Giorgio Giaretta, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 460 days.

(21) Appl. No.: 10/449,304

(22) Filed: May 29, 2003

(65) Prior Publication Data

US 2004/0086276 A1      May 6, 2004

Related U.S. Application Data

(63) Continuation-in-part of application No. 10/288,324, filed on Nov. 5, 2002, now Pat. No. 6,898,379.

(60) Provisional application No. 60/423,970, filed on Nov. 5, 2002.

(51) Int. Cl.
*H04B 10/06*      (2006.01)

(52) U.S. Cl. .................................... 398/208

(58) Field of Classification Search ................. 398/149, 398/39
See application file for complete search history.

(56) References Cited

U.S. PATENT DOCUMENTS 5,191,462 A * 3/1993 Gitlin et al. ................ 398/209
5,462,499 A   10/1995 Bullmer et al.
5,793,511 A *  8/1998 Bulow ....................... 398/147
6,016,379 A *  1/2000 Bulow ....................... 385/147
6,583,903 B1 *  6/2003 Way et al. .................. 398/152
6,731,683 B1   5/2004 Fiedler et al.
6,885,828 B1 *  4/2005 Cornelius ................... 398/209
6,940,924 B1 *  9/2005 Kim et al. .................. 375/340
6,987,804 B2 *  1/2006 Buchali et al. ............. 375/233
7,095,961 B2 *  8/2006 Ibukuro ..................... 398/155
2003/0011835 A1 * 1/2003 Elbers et al. ............... 359/110
2004/0005001 A1 * 1/2004 Jones et al. ................. 375/232
2004/0156448 A1 * 8/2004 Sahlin et al. ............... 375/316

FOREIGN PATENT DOCUMENTS

JP      2002152284      5/2002

OTHER PUBLICATIONS

I. Shake et al., "Averaged Q-Factor Method Using Amplitude Histogram Evaluation for Transparent Monitoring of Optical Signal-to-Noise Ratio Degradation in Optical Transmission System", Journal of Lightwave Technology, vol. 20, No. 8, Aug. 2002.*

* cited by examiner

*Primary Examiner*—Shi K Li
(74) *Attorney, Agent, or Firm*—Workman Nydegger (57) ABSTRACT

A method of reducing interference in a data stream includes filtering the data stream using a first equalizer to output a first filtered data stream. Also, the data stream is filtered using a second equalizer to create a second filtered data stream. Then, one or more error rates based on the first filtered data stream and the second filtered data stream are determined. Based at least in part on those error rates, a filtered data stream is selected from among the first filtered data stream and the second filtered data stream. A threshold value is determined, and then compared against the selected filtered data stream to generate a data bit.

10 Claims, 6 Drawing Sheets

SYSTEM AND METHOD FOR REDUCING INTERFERENCE IN AN OPTICAL DATA STREAM USING MULTIPLE, SELECTABLE EQUALIZERS

This application claims priority on U.S. provisional application No. 60/423,970 filed Nov. 5, 2002, and is also a continuation-in-part of U.S. Non-Provisional patent application Ser. No. 10/288,324, filed Nov. 5, 2002, now U.S. Pat. No. 6,898,379, entitled "System and Method for Reducing Interference in an Optical Data Stream," both of which are incorporated by reference herein.

FIELD OF THE INVENTION

The present invention relates generally to optical transceiver equalizers, and particularly to a system and method for reducing interference in an optical data system by dynamically selecting an equalizer, from among multiple equalizers having configurable parameters, best suited to reduce interference in the communication channel.

BACKGROUND OF THE INVENTION

Transmission of data over long distances of optical fiber is limited by interference, such as from chromatic dispersion, which limits the usable bandwidth of the fiber. Chromatic dispersion is a result of the basic method by which fiber optic systems work. In particular, fiber optic transceivers work by transmitting "1" and "0" pulses, using two discrete levels of laser current to generate the two different pulses. But, the optical frequency of a semiconductor laser depends on the laser's current and the time derivative of the current. Ordinarily, this would not cause a problem, except that different optical frequencies travel at different velocities in an optical fiber. The result is that neighboring "1" and "0" pulses spread into one another. Over long distances of fiber, the effect from chromatic dispersion can become severe and the original data can no longer be recovered.

Chromatic dispersion is particularly an issue for 1550 nm laser light. This wavelength is used for long-distance transmission because it can be amplified by erbium-doped fiber or waveguide amplifiers, and because optical fiber has low attenuation at this wavelength. In contrast, laser light at 1310 nm, typically used for short-distance transmission, generally has very low chromatic dispersion in standard optical fiber.

Traditional prior-art solutions to chromatic dispersion generally fall into two classes: (i) limiting the optical frequency excursions (i.e., sidebands) of the transmitter, commonly known as "chirp"; and (ii) using special fiber- or optical-compensation elements so that different optical frequencies have the same transmit time from transmitter to receiver.

Examples of the specific technologies used to limit the chirp of a transmitter include: (1) special low-chirp or negative-chirp lasers that are designed to work at a fixed temperature maintained by a thermoelectric cooler; (2) externally-modulated lasers (EMLs); and (3) external modulation by lithium niobate or similar electro-optical modulators. However, these technologies generally add significant cost to a transceiver, as well as increased power consumption. Furthermore, it is theoretically impossible to completely remove chirp from a transmitter, since the modulation of an optical signal necessarily creates sidebands.

Examples of the specific technologies used as fiber- or optical-compensation elements include: (1) special low-dispersion fiber; (2) chirped fiber Bragg gratings; and (3) dispersion-compensating fiber. Like the technologies that limit chirp, these particular technologies are costly. They are also inconvenient for the customer to implement, and there is typically some residual dispersion penalty if the setup is not done perfectly.

Other types of dispersion that may occur in a fiber optic communication channel include polarization-mode dispersion and multimode-fiber dispersion.

One technique to reduce interference from dispersion is to utilize a linear equalizer, which is typically a transverse filter with multiple taps having various tap weights. The tap weights can be preset in the factory, or can be manually adjusted during installation. One potential problem with preset or manually-adjusted tap weights is that it may be difficult to optimize these parameters. Furthermore, manual adjustments cannot be used to compensate for variations in devices over time (e.g., with temperature), or to track polarization dispersion. These issues can be addressed, however, by using adaptive updating of the tap weights. An example of a well-known algorithm used to adaptively update tap weights is the least-mean-square algorithm. However, at the high-data rates of long-haul systems, the complex circuitry necessary to implement least-mean-square processing is complex, expensive, and, moreover, can consume an extensive amount of power.

Given the increasing speed of today's high-speed optical data communications system, with data rates of 5-10 Gb/s or even higher, and the increasing use of multiple channels on a single fiber optic, it is increasingly necessary to have an effective method to reduce interference in the optical signals. A technique that can reduce interference with minimal additional power requirements, and minimal additional manufacturing costs, would be highly desirable.

SUMMARY OF THE INVENTION

In one embodiment, the invention is a method of reducing interference in a data stream. The method includes filtering the data stream using a first equalizer to output a first filtered data stream. Also, the data stream is filtered using a second equalizer to create a second filtered data stream. Then, one or more error rates based on the first filtered data stream and the second filtered data stream are determined. Based at least in part on those error rates, a filtered data stream is selected from among the first filtered data stream and the second filtered data stream. A threshold value is determined, and then compared against the selected filtered data stream to generate a data bit.

In another embodiment, the invention is a system for determining a value of a current bit in an optical data stream. The system includes a converter to convert the optical data stream to an electrical data stream. Also, the system includes a multitude of equalizers to filter the electrical data stream and to generate a plurality of filtered data streams. Each equalizer is separately configurable.

The system further includes a microcontroller. The microcontroller has logic for separately configuring each equalizer based on one or more parameters related to the optical data stream. Additionally, the microcontroller has logic for determining a multitude of error rates, where each error rate corresponds to a filtered data stream. Also, the microcontroller has logic for selecting a filtered data stream from among the multitude of filtered data streams based on the multitude of error rates. Finally, the microcontroller has logic for determining a threshold value to compare against the selected filtered data stream.

The system also includes a comparator to compare the determined threshold value against the selected filtered data stream to generate the value of the current bit.

The types of characteristics of the received signal for which each equalizer can be configured include laser type, laser temperature, transmission rate, transmission wavelength, type of dispersion, distance of data transmission, type of fiber, type of transmitting laser, temperature of transmitting laser, temperature of fiber, signal ingress, and type of external modulator.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

In this specification, a "subset" of a thing can mean a portion of the thing, up to and including the entirety of the thing.

Figure 1:
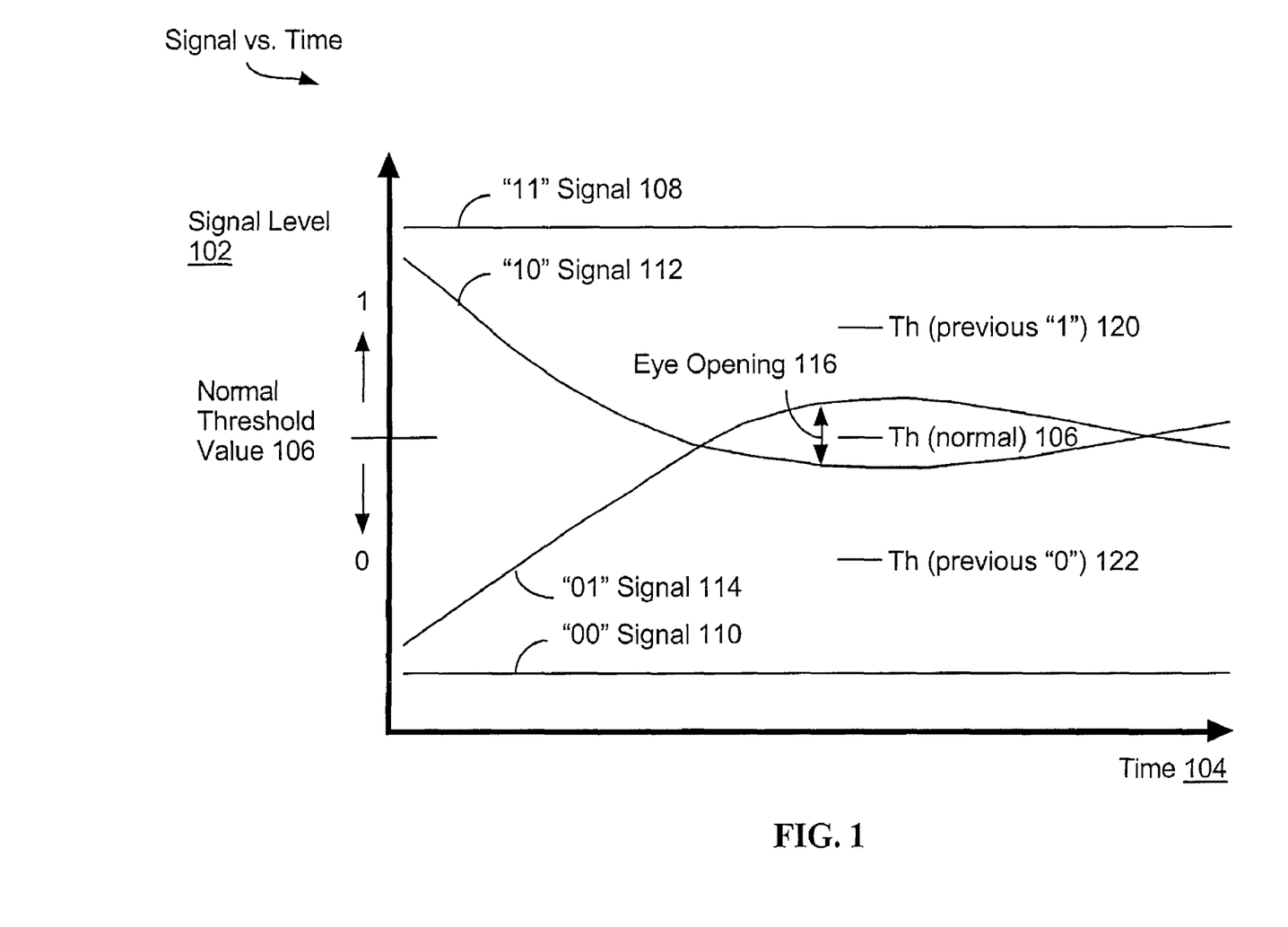
FIG. 1 is a graph plotting signal value against time, demonstrating the effects of chromatic dispersion in reducing the size of the eye opening of overlapping data signals.

The effects of chromatic dispersion are best understood in the context of an eye diagram, such as shown in FIG. 1. In this graph, where signal level 102 is shown on the vertical axis, and time 104 is shown on the horizontal axis, the signal level difference between a binary "1" value and a binary "0" value can be as great as between "11" signal 108 and "00" signal 110 (the signals represent bit-pairs). In this case, determining whether a signal is in fact a "1" or a "0" is straightforward—it depends on which side of the normal threshold value 106 the signal falls. Given the amount of distance (i.e, signal strength) between the normal threshold value 106 and the "11" signal 108, for example, there is little chance of an erroneous signal determination that the signal contains a binary "1".

Due to the effects of chromatic dispersion (and other forms of intersymbol interference, such as polarization-mode dispersion and multimode fiber dispersion), however, the eye opening in an eye diagram can become quite small, or even closed. This is shown in FIG. 1 as narrow eye opening 116. In this case, the distance between, for example, "10" signal 112 and normal threshold 106 value is much less, and can easily lead to erroneous signal detection. Specifically, in trying to determine the "0" bit of the "10" signal 112, the signal swings below the threshold 106 (indicating a "0"), but only slightly—resulting in a larger margin of error. If the eye opening is closed or nearly-closed, it may become impossible to detect the value of the signal.

In the present invention, equalizers are used to reduce interference, such as the chromatic dispersion effects described, in an optical data stream. However, instead of using complex digital circuitry that is highly power-consumptive, the multi-equalizer device of the present invention utilizes multiple analog equalizers, each separately configured for different signal or channel parameters. One important advantage of analog equalizers is that they are easy to implement in silicon, such as part of an integrated circuit. Another advantage is that, in general, analog equalizers require less power than their digital counterparts—for example, a fully-digital, adaptively-updated equalizer may require watts of power, where a multitude of analog equalizers may only require milliwatts.

Historically, analog equalizers have not been as favored as adaptive digital equalizers because they are not as adaptively-configurable as digital versions, and therefore cannot filter out changing interference as well. However, because analog filters are cheap to implement, and use only a fraction of the power of digital versions, many analog equalizers can be utilized on a single IC chip. As such, many different analog filters can be used in the multi-equalizer device of the present invention. Each equalizer filters the incoming signal using slightly different tap coefficients, or tap spacing. The coefficients for each filter may be optimized for different possible features of the incoming optical signal, or on fiber optic characteristics, such as type of fiber, length of transmission, transmission speed, etc. The equalizer coefficients can be preset, or can be dynamically set, and adjusted. A microcontroller or other type of logic generates error rates based on each different filtered signal, and then selects the filtered signal producing the lowest error rate for comparison against a threshold value for data bit detection. In order to save power, the microcontroller can cycle through the equalizers, powering down equalizers or sets of equalizers on a periodic basis.

Figures 2, 3:
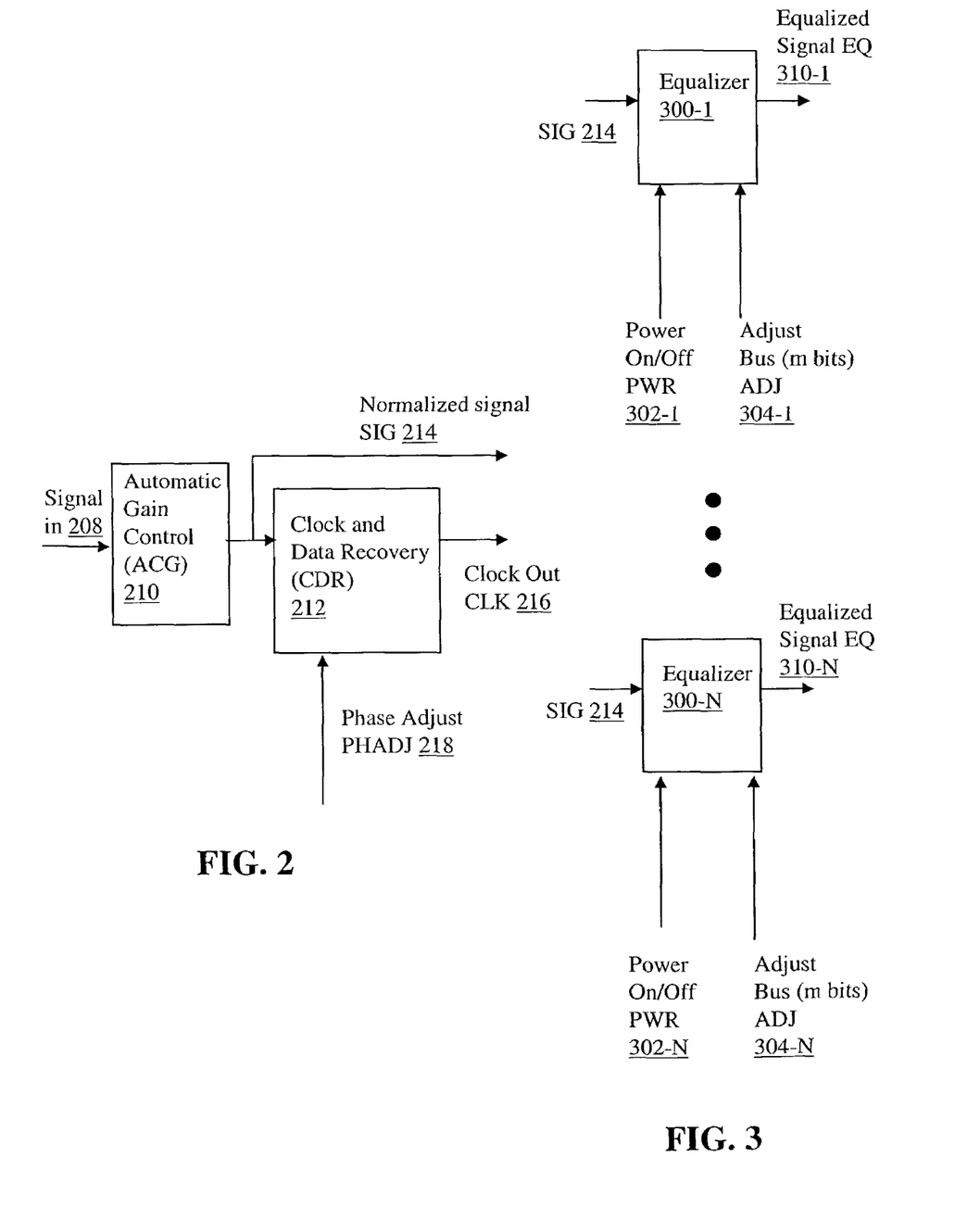
FIG. 2 is a block diagram of the signal normalization and clock-recovery circuits of one embodiment of the present invention.
FIG. 3 is a block diagram of a set of equalizers that can be used in accordance with an embodiment of the present invention.

Referring to FIG. 2, an example of the front-end of a multi-equalizer device in accordance with one embodiment of the present invention is shown. An optical signal is received and converted to an electrical signal, for example by an optoelectronic receiver or transceiver (such as a GBIC or SFF transceiver that operates at the wavelength of the received optical signal). The electrical signal 208 is provided to an automatic gain control circuit 210 (which typically uses feedback to perform gain control—not shown). A normalized signal, SIG 214, results. Also, a clock and data recovery circuit 212 recovers the signal clock, adjusted by phase-adjust signal PHADJ 218. The recovered clock is the clock-out signal CLK 216.

A set of analog equalizers 300-1 . . . 300-N is shown in FIG. 3. The equalizers receive the normalized signal, SIG 214, which is replicated or amplified as necessary to provide the same signal to each of the equalizers. An IC implementing the present invention may contain a few, a few dozen, or even a few thousand different equalizers 300. The other inputs to each equalizer include power on/off signal, PWR 302-1 . . . PWR 302-N, and m adjust bits on an adjust bus, ADJ 304-1 . . . ADJ 304-N. The PWR and ADJ signals will be described below in conjunction with the microcontroller.

The output of the equalizers 300-1 . . . 300-N are the corresponding equalized signals, EQ 310-1 . . . 310-N. These are also known as the filtered signals, the filtered data stream, and the filtered output signals.

Figure 4:
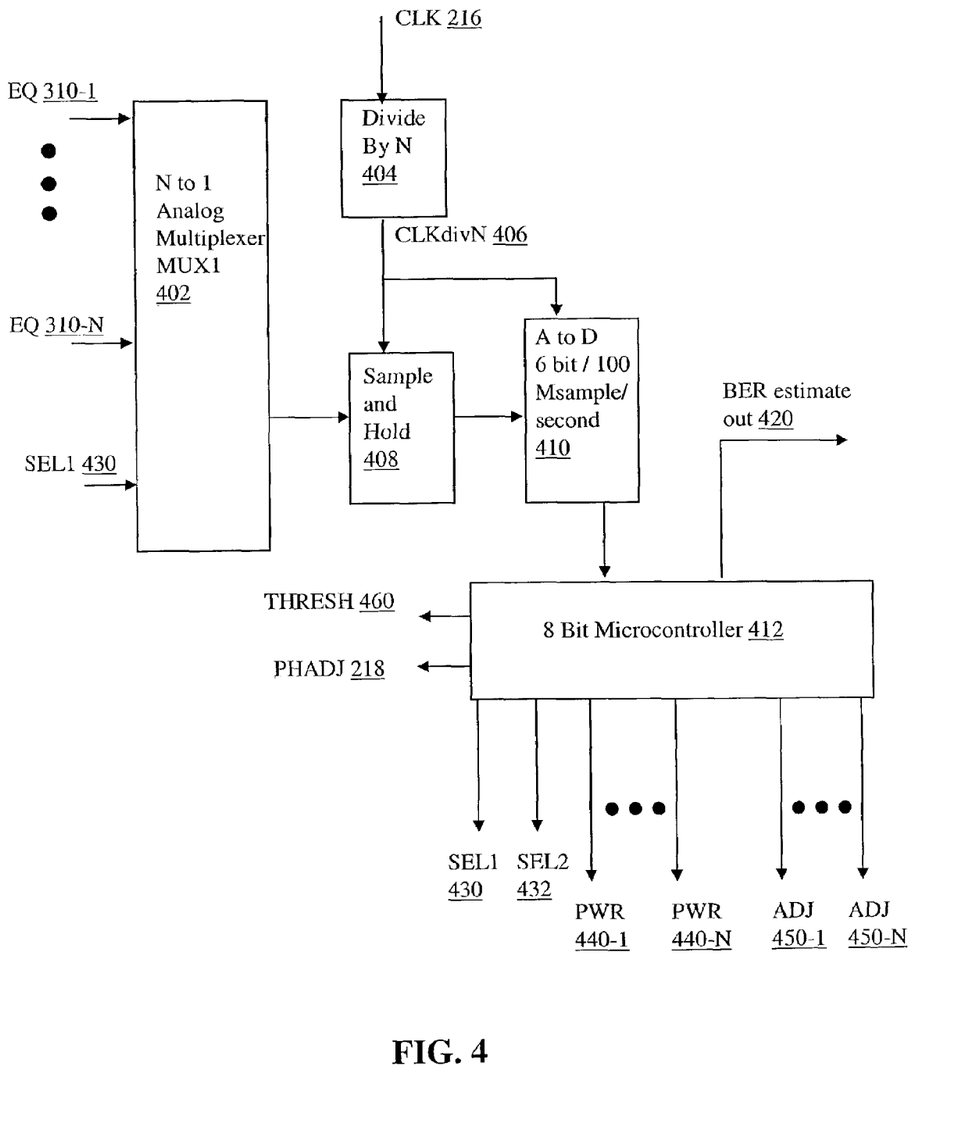
FIG. 4 is a block diagram of a microcontroller and error-monitoring logic used in conjunction with an embodiment of the present invention.

Referring to FIG. 4, the "brains" of an equalization subsystem are shown. The filtered signals output by the equalizers EQ 310-1 . . . 310-N are provided as inputs to an N:1 analog multiplexor, MUX1 402. The select line, SEL1 430, is provided by the 8-bit microcontroller 412, in a manner that will be described further below. The output of MUX1 402 is provided to a sample and hold circuit 408, before being sampled by an analog to digital converter 410. In one embodiment, the converter 410 is a 6-bit, 100 Msample/second analog to digital converter, but other types of analog to digital converters with other bit depths may be used in other embodiments. The sample and hold circuit 408 and A to D converter 410 are synchronized to the recovered clock, divided by the number of equalizers used in the equalizer system (N), through clock signal CLKdivN 406, which is derived by providing the recovered clock signal 216 to divide by N logic 404. The advantage of reducing the clock speed by a factor of N is that a slower, and therefore cheaper, A to D converter 410 can be utilized, particularly with a multi-equalizer device having a large number of equalizers.

The now sampled-and-delayed output of MUX1 402 is provided as an input to the microcontroller. By outputting SELL signal 320, the microcontroller 412 can control which digitally-sampled filtered signal, output by a particular equalizer, it receives. In other words, the microcontroller, which creates error signals based on the digitized filtered signal it receives, can monitor equalizer output in accordance with any number of different types of schedules. The microcontroller 412 can periodically cycle through the equalizers, can use algorithms to review equalizer output in accordance with preset logic, or can dynamically adjust which equalizers it analyzes, and in which order. Although only one sampled filtered equalizer signal is provided to microcontroller 412 in FIG. 4, in other embodiments, multiple filtered signals can be provided to the microcontroller in parallel.

By creating an error signal for each equalizer, the microcontroller can get a "snapshot" of how accurate each particular equalizer is filtering the received signal. This is important because the various filters are configured for different possible parameters of the incoming signal. (The different possible parameters for the incoming signal, or for the channel over which the signal is received, are also referred to herein as signal parameters and characteristics). Examples of the types of parameters, or categories, that each equalizer might be specifically configured for, include: laser type, laser temperature, transmission rate, transmission wavelength, type of dispersion, distance of data transmission, type of fiber, type of transmitting laser, temperature of transmitting laser, temperature of fiber, signal ingress, and type of external modulator. Any other parameter of the laser, communication channel, or environment that might affect or cause interference in the signal may also be used. Also, where an equalizer may be configured for one category of parameter, such as transmission distances, a different equalizer may also be configured for a transmission distance, but set to a different value. For example, one equalizer may be specifically optimized for signals received over 40 km, another for signals received over 30 km, and a third for signals from 20 km away.

By obtaining a snapshot of equalizer performance, the microcontroller 412 can determine which equalizer is best optimized for filtering the incoming signal, and use the filtered output signal from that equalizer for comparison against a threshold value to determine the value of the current data bit (i.e., by the detector portion of the device in which the equalizers are used). The microcontroller is preferably configured to monitor the error rate of the same equalizer that has been selected to output the filtered signal for comparison, as well the error rate of other equalizers, and to determine if there is another equalizer that would provide better equalizer performance than the currently selected equalizer. The selection of the filtered signal to be compared is determined by the SEL2 signal 432, in a manner that will be explained in conjunction with FIG. 5.

The information about equalizer performance gleaned by the microcontroller 412 (e.g., through error rates) can also be used for additional, optional functionality. For example, the microcontroller can output the power on/off signals PWR 440-1 . . . PWR 440-N based on this information, shutting down an equalizer (or set of equalizers) when it is not being used (e.g., when an equalizer is performing poorly due to the equalizer being improperly-configured for the actual parameters of the received signal). Using the PWR 440-1 . . . PWR 440-N signals, the microcontroller can cycle through, e.g., banks of equalizers, turning on a bank only long enough to determine if that bank can adequately filter the received signal so as to warrant further consideration. In this context, a "bank" of equalizers may correspond to a particular parameter—e.g., the type of fiber or the wavelength of the incoming signal. By only keeping certain segments of the equalizers on at any one time, greater power efficiencies can be realized.

Another optional use of monitoring equalizer performance is to adjust each equalizer's configuration, i.e., to fine-tune an equalizer. For example, if an equalizer is optimized to receive signals at 50 deg Celsius, but the actual operating temperature of a transmitting laser is 52 deg Celsius, it may be desirable to fine-tune the particular equalizer to the actual operating temperature. In this manner, the microcontroller 412 also outputs the m-bit adjust signals ADJ 450-1 . . . ADJ 450-N. As described, these signals are provided as inputs to equalizers 300-1 . . . 300-N. These signal can be used to change the tap weights of the coefficients in the filters, or the tap spacing in the filter. If the equalizers utilize circuitry other than a transverse filter, the adjust signals can be used to adjust other configurable features of the filter. The adjust signal bits are, in one embodiment, digital bits that are communicated over a bus. At each individual equalizer 300-1 . . . 300-N, the bits can be stored in registers to configure filter parameters, whether by setting values or by adjusting them.

In another embodiment, the original configuration of each equalizer is not preset, but is set by the microcontroller dynamically or at initialization of the system. The specific signal or channel parameters used to configure the equalizers are stored in a memory, such as a flash memory, that the microcontroller accesses, for example during initialization of the multi-equalizer device.

The microcontroller 412 further outputs a threshold value THRESH 460, and a phase-adjust value, PHADJ 218. The PHADJ signal 218 is used by the clock and data recovery circuit 212 (FIG. 2) to keep the recovered clock aligned with the signal clock rate. The use of the THRESH signal 460 will be described below in conjunction with FIG. 6.

Finally, microcontroller 412 also outputs an estimate of the bit-error rate (BER) 420. While the BER signal 420 generally tracks the error rate of the equalizer that has been currently selected to send its filtered output signal to the detector-portion of the circuitry, in other instances, the microcontroller may output the error rate of any other equalizer. Thus, in this manner, the error rate of the current equalizer being monitored, as opposed to being selected, can be output as BER 420, from which further auxiliary analysis can be conducted. Or, in another use, the BER 420 signal can be used to monitor and fine-tune, or to reprogram, the signal-quality optimization logic of the microcontroller 412.

In other embodiments, other forms of digital logic, such as a FPGA, EEPROM, CPU, ASIC, or discrete digital components, can be utilized to implement the functionality of microcontroller 415. Alternatively, analog circuitry can be used.

Figure 5:
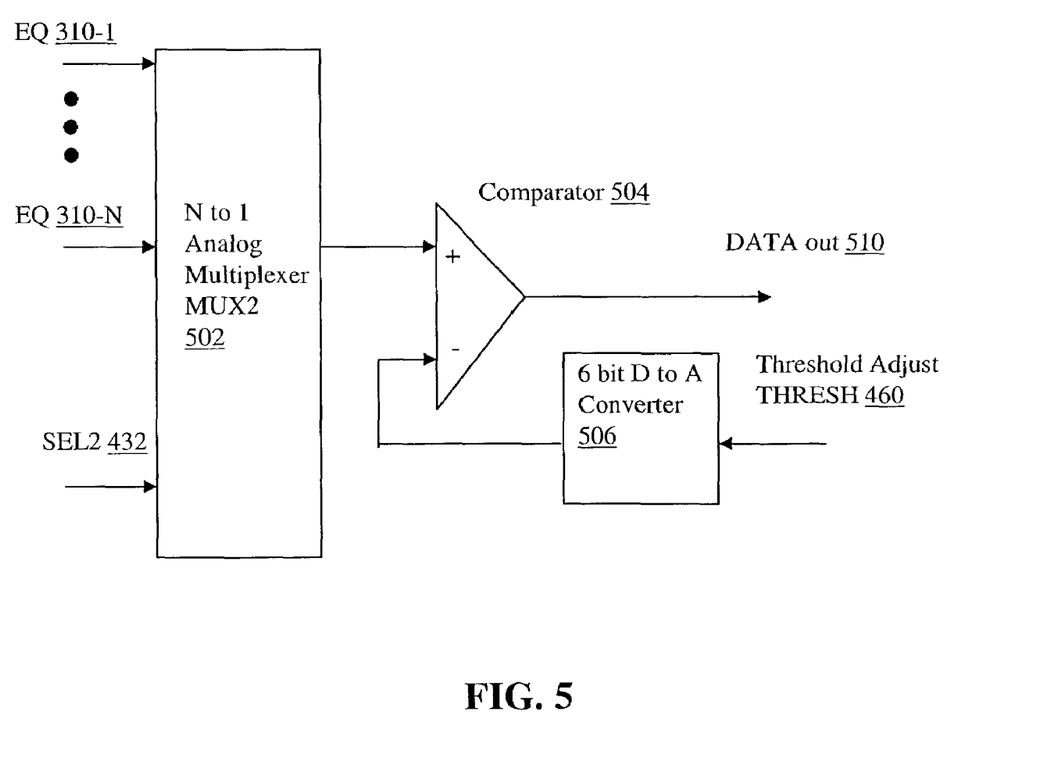
FIG. 5 is a block diagram of selection and comparison logic to output the filtered signal from the best-adapted equalizer according to one embodiment of the present invention.

Referring now to FIG. 5, the detector-portion of the multi-equalizer device of the present invention is shown. Again, the filtered, equalized signals EQ 310-1 ... 310-N are provided to a multiplexor, this time the N:1 analog multiplexor MUX2 502. The SEL2 signal 432 generated by the microprocessor 412, as explained above, selects the filtered signal to be passed through the multiplexor and compared by comparator 506. The other input to comparator 504 is the threshold-adjust signal 460, after it has been converted to an analog value by 6-bit D to A converter 506. The comparison of the threshold value to the selected filtered signal results in the value for the current bit, i.e., a one or a zero, depending on whether the selected filtered signal for the current bit is greater than or less than the threshold value, respectively. The value for the current bit is output as the DATA out signal 510.

The threshold adjust signal THRESH 460 is also determined by microcontroller 412. The original threshold value may be preprogrammed into the microcontroller, or may be determined dynamically when a signal is originally received. The threshold may be based on a histogram of the received and filtered signal, as will be described next.

Figure 6:
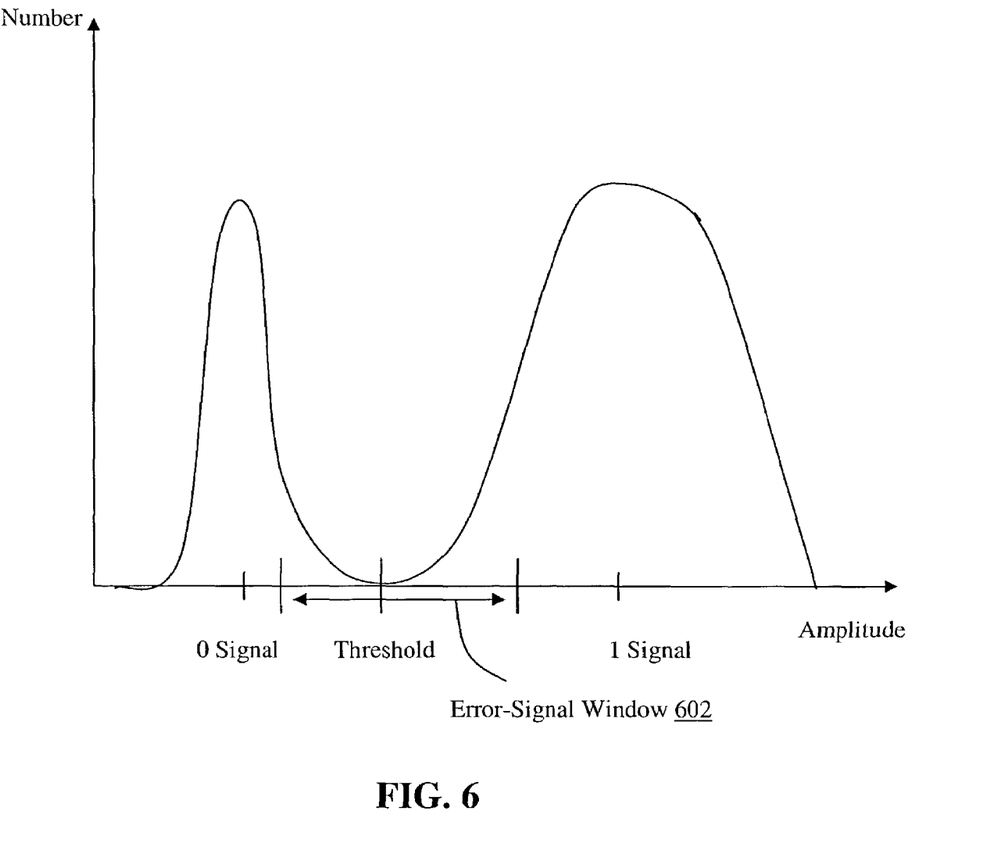
FIG. 6 is a graph showing an example of a histogram of signals received and filtered by an equalizer.

Turning to FIG. 6, a histogram of a filtered signal is shown. The graph shows, on the Y axis, the number (amount) of a particular signal value received, and on the X axis, the amplitude of the signals received. In other words, the graph plots the ranges and values of the signals received and filtered over a period of time. The center point of the bell curves for a "0" and a "1" signal are shown. In general, the curve for the "1" signal is wider than for the "0" signal because more noise is produced when the transmitting laser is on than when it is off—hence, the greater range in amplitude of signals around the center point of the "1" signals.

The information in FIG. 6 can be used by the device's microcontroller to set and adjust to a threshold value, and to generate an error signal for the filtered signal shown. As shown in FIG. 6, because the bell curve for the "1" signal is wider than for the "0" signal, setting the threshold at the unadjusted center point of the amplitude (x-axis) would result in a threshold improperly shifted too far along the "1" bell curve (toward the right-side of the page). In other words, some of the filtered signals that should be "1"'s would be mistakenly determined to be "0"'s. But, by analyzing the data contained in FIG. 6 for a filtered signal, the microcontroller can determine the proper value for the threshold. One method to determine where the threshold should be set, or adjusted toward, is to integrate under the curves of FIG. 6, such that the lowest value between the "0" and "1" bell curves would indicate the statistical center and therefore the proper threshold value (as shown). Because the information in this graph would change over time, by continually monitoring it, the microcontroller can adaptively update the value of a variable threshold.

Another use for the information in FIG. 6 is to determine the error rate of a filtered signal. This determination can be made by monitoring an error-signal window 602. By monitoring an error signal window of the same size for a series of filtered signals, the microcontroller can comparatively determine which filtered signal, and therefore which equalizer, produces the lowest error rate. It can do this by, for example, integrating under the histogram curve for the span of the window, with the lowest integral representing the smallest error signal. (This is because the greater the distance between the center point of the "0" and "1" curves, the better the filtering by the particular equalizer. If the "0" and "1" curves are further apart, the integral of the error-signal window 602 will be smaller). Other techniques for estimating the error rate of the filtered signal can also be utilized, so long as the microcontroller can compare multiple error rates associated with multiple equalizers to determine which is best optimized for the actual parameters of the received signal.

Figure 7:
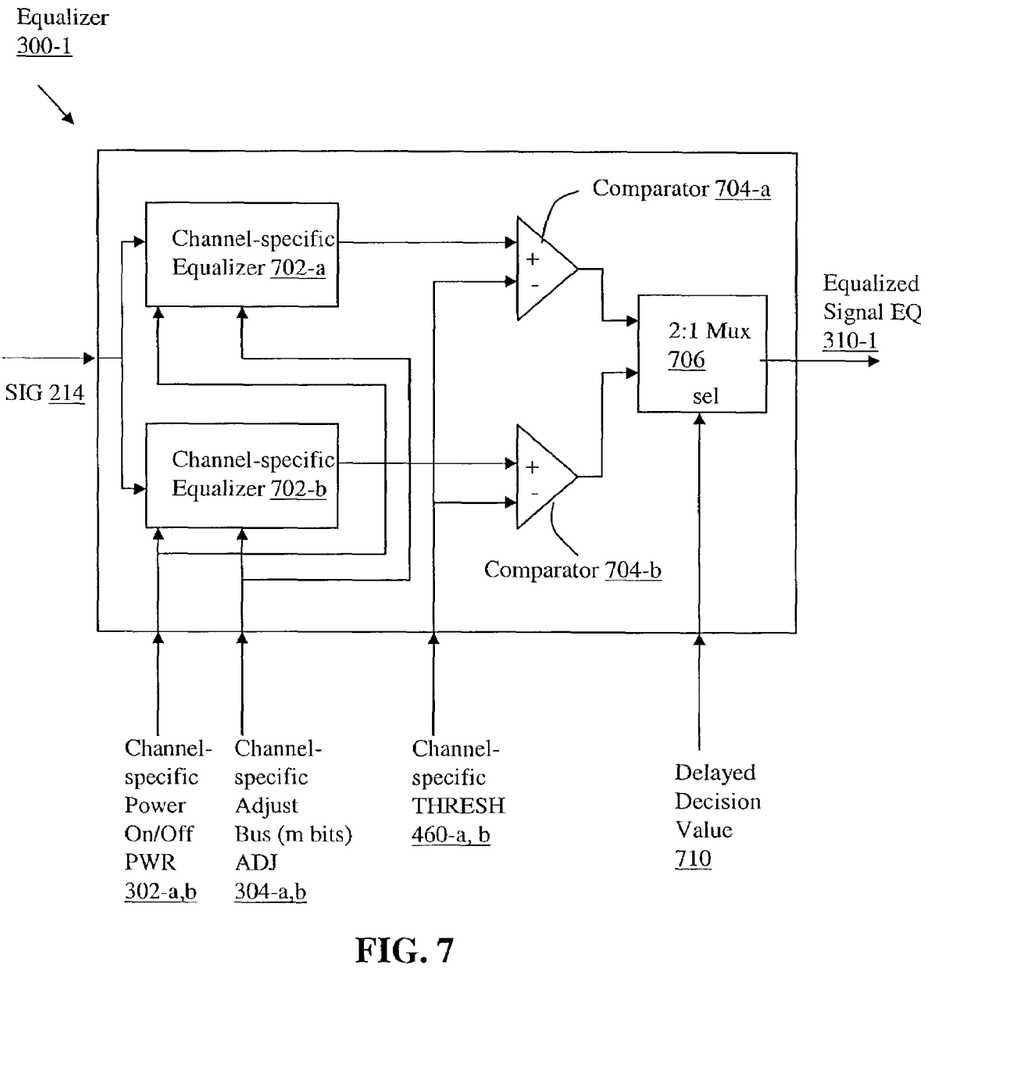
FIG. 7 is a block diagram showing an example of an equalizer that utilizes a maximum-likelihood detector, in accordance with another embodiment of the present invention.

Referring to FIG. 7, another embodiment using a maximum-likelihood detector (or, alternatively, a nonlinear canceller) is shown. This embodiment is based on changing the value of the threshold by utilizing the previous bit in the signal to adjust the threshold value for the current bit to be determined. (This is similar to the adaptive threshold adjustment described above, but the adjustment is made based on the value of the previous bit, instead of histogram values for the received signal).

Referring back to FIG. 1 for a moment, it can be seen that the preceding bit affects the signal level of the current bit—as shown in FIG. 1, the "0" bit of the "10" signal 112 does not reach as low of a signal level as the "00" signal 110. Similarly, the "1" bit of the "01" signal 114 does not reach as high of a signal level as the "11" signal 108. Therefore, by taking into account the effects of the previous bit (or multiple previous bits) by modifying the threshold value accordingly, more accurate bit value determination is achieved. For example, if the threshold is changed to threshold value 120, based on a previous "1" bit, and then compared against the "0" bit of the "10" signal 112, the distance between signal and threshold becomes much greater, increasing the certainty that this bit of the signal is a "0." Correspondingly, this decreases the margin of error in the bit determination. Similarly, if the threshold is changed to threshold value 122, based on a previous "0" bit, and then compared against the "1" bit of the "01" signal 114, again, the distance between signal and threshold increases, as does the likelihood that the value of the bit is a "1".

Referring back to FIG. 7, the normalized signal SIG 214 is provided to equalizer 300-1 (as with previous embodiments, there will be multiple separate equalizers 300-1 ... 300-N, of which 300-1 represents one example). The SIG 214 is provided as inputs to two channel-specific equalizers 702-a,b. A "channel" in this context corresponds to a unique possible value for N prior bits, for a total of $2^N$ total channels. In FIG. 7, only one prior bit is utilized to reduce interference; therefore, there are two possible values for the previous bit (i.e., a "0" or a "1") and hence a total of two channels.

The other inputs to the channel-specific equalizers 702-a,b are the channel-specific power on-off signals, PWR 302-a,b, and the channel-specific adjust bits signals, ADJ 304-a,b. The signals may be different for each channel-specific equalizer. In other words, the microcontroller can fine-adjust PWR 302-a,b and ADJ 304-a,b differently for the two channel-specific equalizers, which are otherwise configured the same, based on a possible value for the previous bit. (Thus, e.g., the equalizer 300-1 may be configured specifically for a transmission, and even more specifically for transmissions over 40 km, but the channel-specific equalizers 702-a,b within the equalizer 300-1 may be slightly adjusted relative to one another based on the previous bit being a "0" or a "1").

The output of each channel-specific equalizer 702-a,b is sent to a respective comparator 704-a,b. The channel-specific threshold signals THRESH 460-a,b are set by the microcontroller, and vary slightly based on a possible value for the previous bit (before that value is actually determined). The microcontroller may use the filtered-signal histogram technique described in conjunction with FIG. 6 to set and/or adjust the threshold values, combined with an adjustment based on a possible value for the previous bit. Alternately, the microcontroller may accumulate data for two histograms, one histogram for bits immediately preceded by a "0" bit and the other histogram for bits immediately preceded by a "1" bit. The two histograms are then analyzed by the microcontroller to generate two threshold values 460-a,b. In embodiments having more than two channels per equalizer, histogram data would be collected for each channel of the equalizer (e.g., separate histograms would be generated for data bits immediately preceded by 00, 01, 10 and 11 data bits). In yet another alternate embodiment, the microcontroller can use an adaptive-updating scheme. The adaptive-updating logic can also be used to determine the PWR 302-a,b and the ADJ 304-a,b signals.

Thus, at each comparator 704-a,b, the filtered output of each channel-specific equalizer 702-a,b is compared against a channel-specific threshold value 302-a,b. The result of each comparison is a tentative decision for the current data bit, corresponding to the particular channel. These tentative decisions are input into a multiplexer 706 (which is a 2:1 multiplexer when the number of channels per equalizer is equal to two). By this time, the actual determined value for the previous bit, now delayed by at least one clock cycle, is available as the delayed-decision value signal 710. This value is accessed, and used as the select line for multiplexer 706 to select a determined value for the current data bit, from among the two tentative decisions, based on the determined value for the previous data bit. In this manner, interference from the previous bit is effectively reduced or canceled out. The determined value is output as the equalized signal EQ 310-1. While in previous embodiments, this signal must be further compared against a threshold value, in the current embodiment this additional comparison is unnecessary.

While not shown, in one embodiment, the microcontroller monitors the filtered output signal from each channel-specific equalizer 702-a,b to determine a corresponding error signal. In other words, the output of each channel-specific equalizer 702-a,b is provided to microcontroller 412, which can then conduct the statistical analysis described earlier to generate corresponding error signals. These error signals can be used to set or adjust the PWR 302-a,b; ADJ 304-a,b; and THRESH 460-a,b signal values.

While specific implementations of the precepts of the present invention have been disclosed, the invention is not meant to be limited to these specific implementations. Much of the logic disclosed can be implemented in other forms, such as in digital form versus analog form, or vice-versa. Also, although parts of the invention have been described as comprising an integrated circuit, in other embodiments, the invention may comprise discrete components, or may be modular, or may be divided into functional units that communicate remotely. In other words, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of determining a value of a current bit in an optical data stream, the method comprising:

receiving an analog electrical signal derived from the optical data stream having known characteristics;

normalizing the analog electrical signal;

configuring a first analog equalizer based at least in part on a first signal parameter associated with the known characteristics, and a second analog equalizer based at least in part on a second signal parameter associated with the known characteristics;

separately providing the normalized electrical signal to the first equalizer and to the second equalizer;

filtering the normalized electrical signal using the first equalizer to create a first filtered signal, and filtering the normalized electrical signal using the second equalizer to create a second filtered signal, the first filtered signal and the second filtered signal provided to both a first multiplexer that selects either the first filtered signal or the second filtered signal using a first selection signal and a second multiplexer having a separate second selection signal to select from the first and second filtered signals;

measuring a first error rate based at least in part on the first filtered signal, and a second error rate based at least in part on the second filtered signal using an output of the second multiplexer;

selecting a filtered signal, from among the first filtered signal and the second filtered signal using, based at least in part on the first error rate and the second error rate; and comparing the selected filtered signal at an output of the first multiplexer to a threshold value to generate the value for the current bit.

2. The method of claim 1, including determining a variable threshold value, the comparing including comparing the selected filtered signal to the determined threshold value to generate the value for the current bit.

3. The method of claim 1, further comprising:

powering down either the first equalizer or the second equalizer based on the first error rate or the second error rate, respectively.

4. The method of claim 1, wherein the first signal parameter is selected from a group consisting of laser type, laser temperature, transmission rate, transmission wavelength, type of dispersion, distance of data transmission, type of fiber, type of transmitting laser, temperature of transmitting laser, temperature of fiber, signal ingress, and type of external modulator.

5. The method of claim 4, wherein the first signal parameter corresponds to a category, and is set for a particular value for the category, and further wherein the second signal parameter also corresponds to the category, but is set to a different value.

6. The method of claim 1, wherein the first error rate is mathematically related to a histogram of the first filtered signal.

7. A method of determining the value of a current data bit in an optical data stream by reducing interference caused by a prior bit, the method comprising:

receiving an electrical signal derived from an optical data stream having known characteristics;

normalizing the electrical signal;

providing the normalized electrical signal to a plurality of equalizers, each equalizer of the plurality of equalizers having been configured based on a parameter associated with the known characteristics of the optical data stream, out of a plurality of parameters associated with the known characteristics;

for each equalizer of the plurality of equalizer:

creating multiple channels for making tentative decisions as to the value of the current data bit, each channel being associated with a unique possible value for the prior bit, each tentative decision made by each channel representing a potential value for the current data bit determined by reducing interference based on the prior bit corresponding to the unique value of the channel; and for each channel of each equalizer:
   filtering the electrical signal, using a channel-specific adaptive filter having variable filter coefficients, to generate a filtered output signal;
   adaptively generating a variable threshold value;
   comparing the variable threshold value against the filtered output signal to generate a tentative decision for the current data bit;
   accessing a determined value for the prior bit from a delayed decision signal;
   selecting a determined value for the current data bit from among the tentative decisions based on the determined value for the prior bit;
   determining a plurality of error signals, each error signal corresponding to the filtered output signal from each equalizer of the plurality of equalizers; and
   selecting a determined value, from among the plurality of determined values of the plurality of equalizers, based at least in part on the plurality of error signals.

8. The method of claim 7, further comprising:
powering down a subset of the plurality of equalizers based at least in part on a subset of the plurality of error signals.

9. The method of claim 7, wherein the variable filter coefficients for each channel specific adaptive filter are configured based in part on the unique value of the corresponding channel.

10. The method of claim 7, wherein the parameter of the optical data stream is selected from a group consisting of laser type, laser temperature, transmission rate, transmission wavelength, type of dispersion, distance of data transmission, type of fiber, type of transmitting laser, temperature of transmitting laser, temperature of fiber, signal ingress, and type of external modulator.

* * * * *